UNITED STATES PATENT OFFICE.

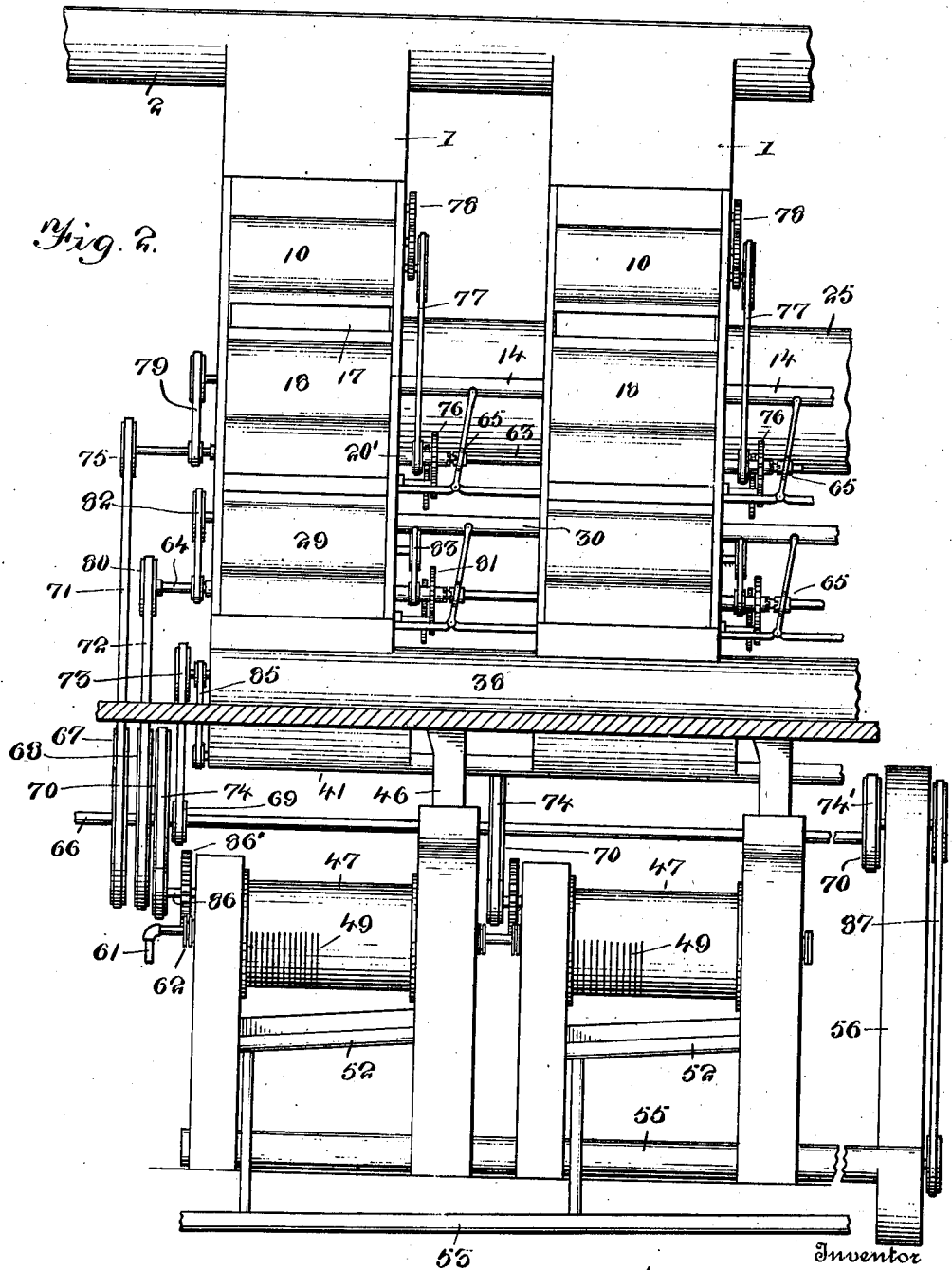

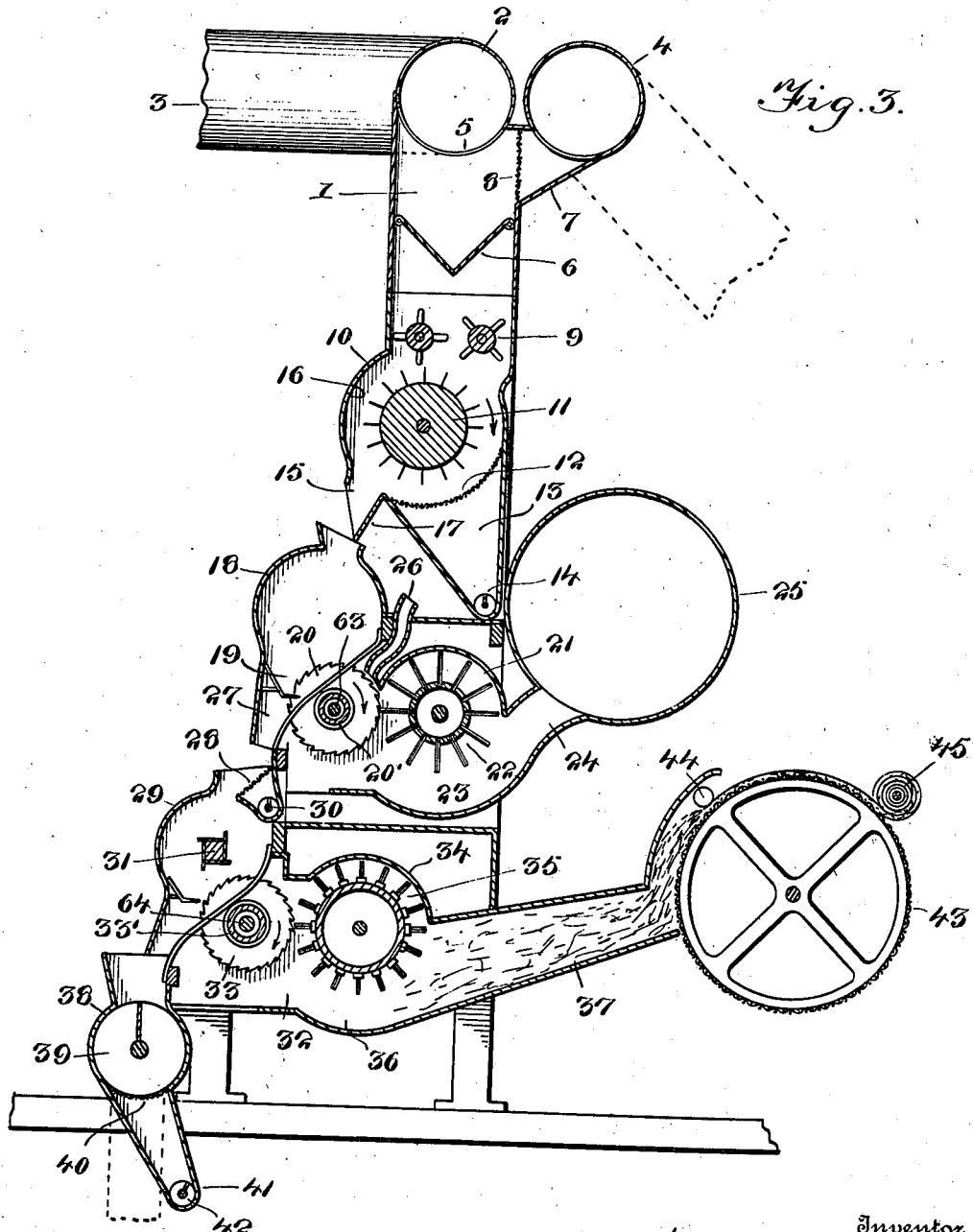

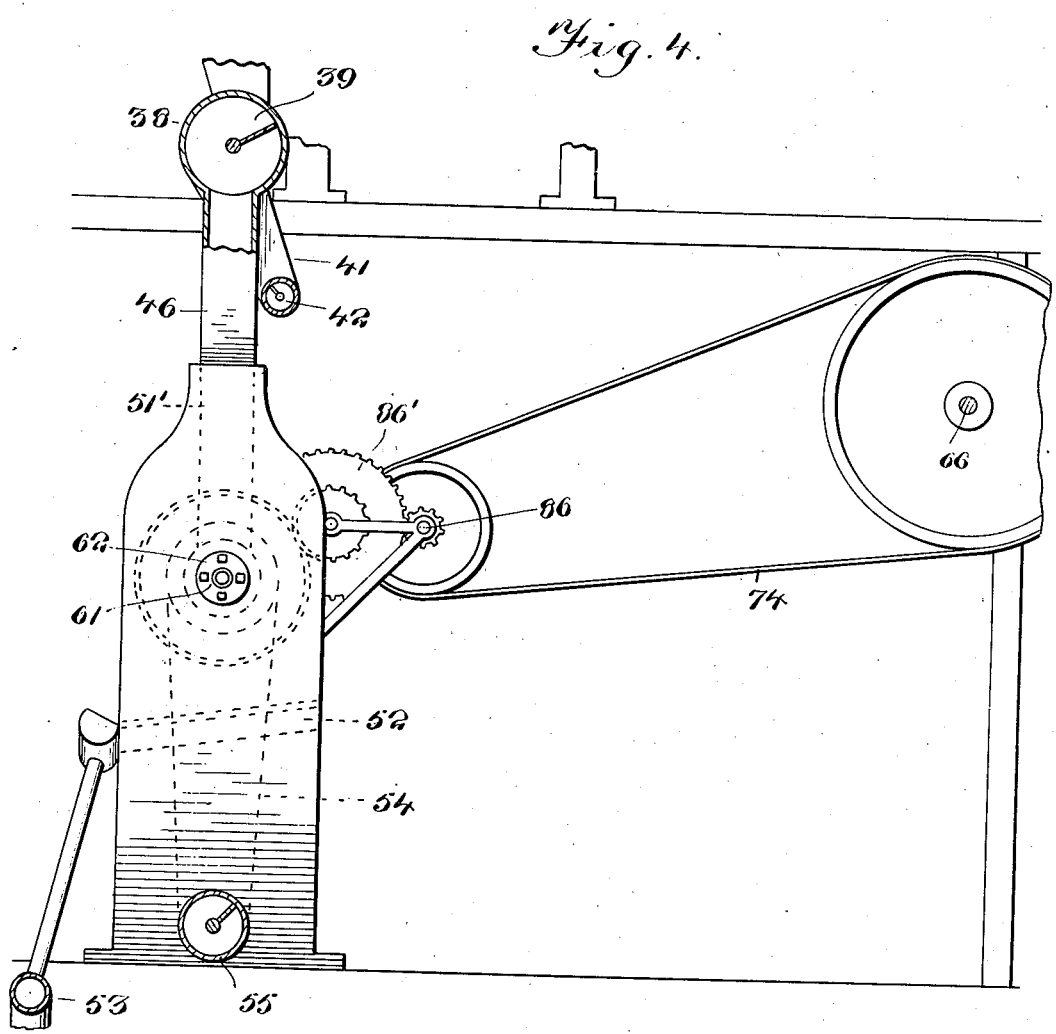
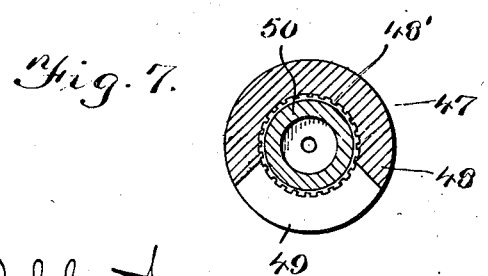

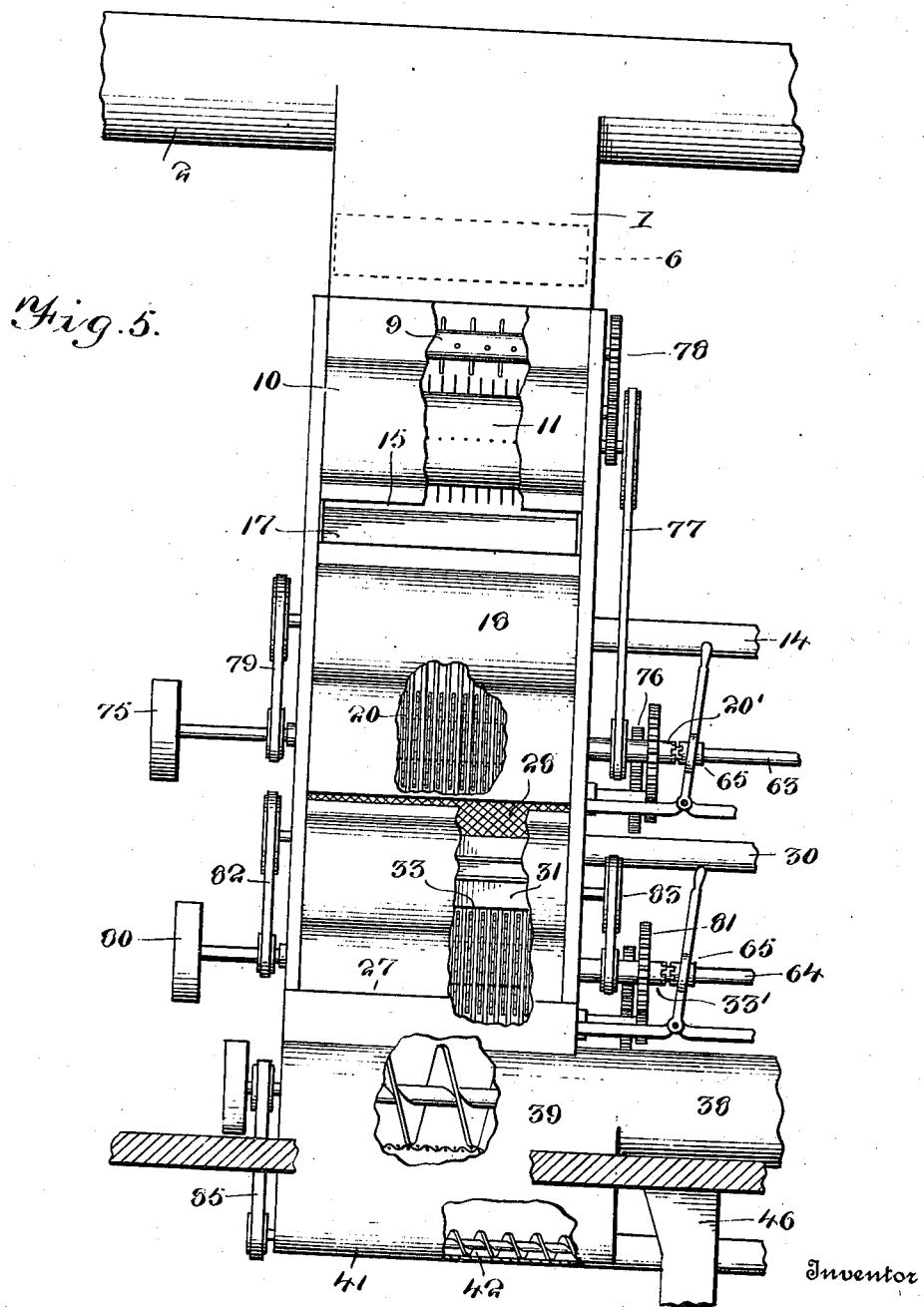

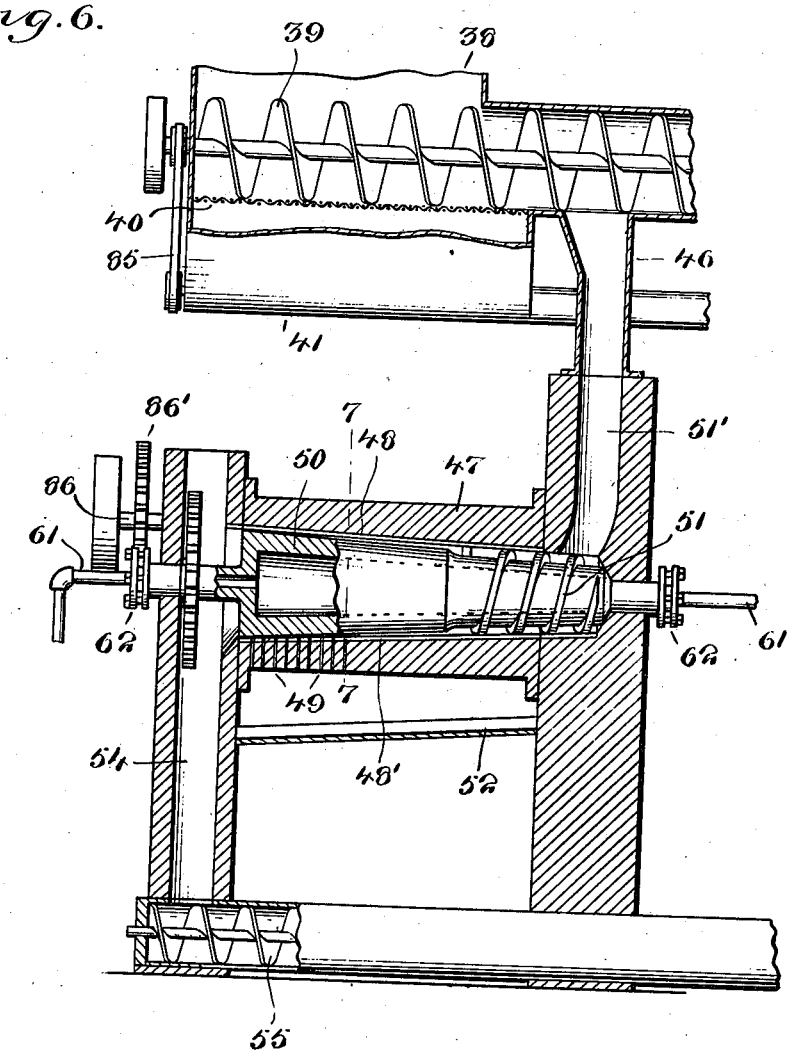

SAMUEL H. DUNLAP, OF BRYAN, TEXAS.

COTTON-TREATING APPARATUS AND PROCESS.

1,215,260.

Specification of Letters Patent. Patented Feb. 6, 1917.

Application filed March 3, 1915. Serial No. 11,812.

*To all whom it may concern:*

Be it known that I, SAMUEL H. DUNLAP, a citizen of the United States, residing at Bryan, in the county of Brazos and State of Texas, have invented new and useful Improvements in Cotton-Treating Apparatus and Processes, of which the following is a specification.

My invention relates to an apparatus and process for treating cotton, and particularly to an apparatus and process whereby the cotton, as it comes from the bolls, will be cleaned, ginned, the cotton and seed separated, the seed reginned or delinted, the long fiber and lint or short fiber respectively formed into bats or bales, the oil extracted from the seed and the solid residue, or by-products from the seed, recovered for use, thus converting all of the raw cotton into its several commercial or marketable products in one handling or one continuous operation.

A further object of the invention is to provide an apparatus and process of a simple and comparatively inexpensive character, whereby the several operations described may be carried out in a rapid, easy and economical manner.

The invention consists of the several steps and features of construction, combination and arrangement of parts herein fully described and claimed, reference being had to the accompanying drawings in which:—

Fig. 2 is a front elevation, partly in vertical longitudinal section, showing two adjacent units.

Fig. 3 is a vertical front-to-rear section through the upper portion of one of the units of the apparatus on an enlarged scale.

Fig. 4 is a sectional end elevation of the lower portion of one of the units of the apparatus looking toward the left hand side of Fig. 2.

Fig. 5 is a front elevation with parts in section of one of the units on an enlarged scale.

Fig. 6 is a vertical longitudinal section through the seed delivery and oil extracting elements, of one of the units, and illustrating more particularly the structural features thereof.

Fig. 7 is a section on line 6—6 of Fig. 6.

Figure 1:
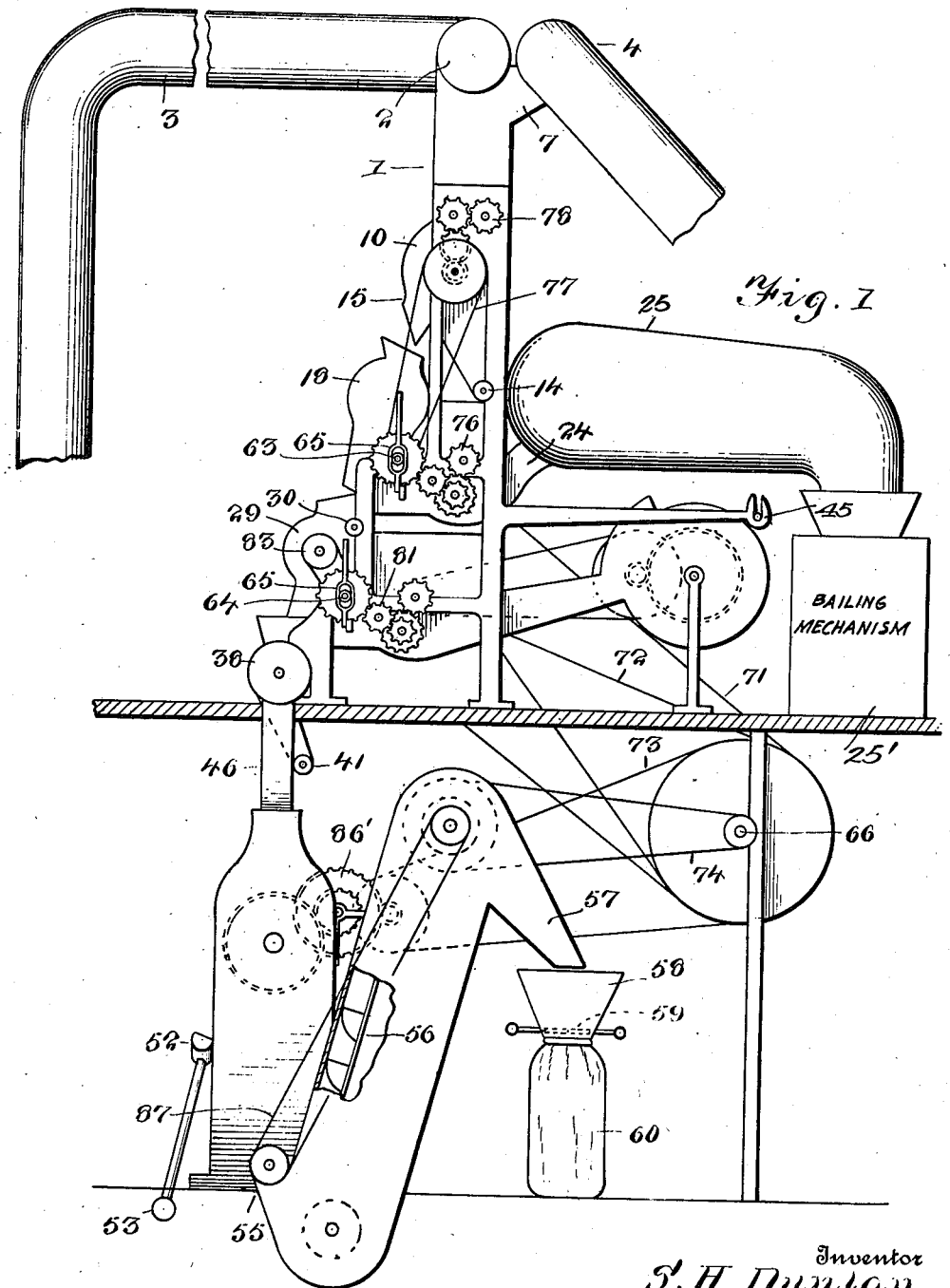
Figure 1 is a sectional elevation taken from front to rear through the apparatus and showing one of the units of the system.

In the carrying of my invention into practice, I preferably make use of operating parts which are peculiarly important in making possible the carrying out of the operations of the apparatus and treatment of the materials in the prescribed manner, such for instance as the round bale cotton compress disclosed in my Patent No. 1,087,002, dated Feb. 10, 1914, and the type of cotton gin and delinter shown in my prior application filed July 25, 1914, Ser. No. 853,047. While these elements of the apparatus are of peculiar advantage and efficiency toward the provision of an operative combination for a continuous and consecutive treatment of the cotton and seed, it will, of course, be understood that the invention is not restricted to the use of these particular instrumentalities, as others might be used with more or less efficiency.

The cotton in its raw state is brought to the gin building in any suitable manner and is elevated to a desired high level by means of a pneumatic elevator, the same comprising a suction box or hopper 1 communicating with a manifold or chamber 2, with which connects a suction pipe 3 leading from the source of cotton supply, and an air exhaust pipe 4 leading from the manifold or chamber 2 to a suction pump or fan located at any suitable point.

The manifold or chamber 2 is in communication with the suction box or hopper 1 at its bottom through a passage 5, and within said box or hopper are disposed flexible or other equivalent flap valves 6 which extend downwardly and inwardly on converging lines. The upper rear portion of the hopper or suction box communicates with the pipe 4 through a lateral conductor 7 having a screen 8 therein, through which the air is exhausted from the top of the hopper, thus causing the valves 6 to be forced together and closed by the suction action from above and the air pressure from below. The box or hopper being thus closed, except at its point of communication through the passage 5 with the pipe 3, the exhaustion of the air from and formation of a partial vacuum within the top of the hopper causes an inrush of air through the pipe 3 to fill the partial vacuum. This inflowing column of air carries with it from the source of supply the cotton to be treated, which is deposited within the top of the hopper.

The cotton accumulates in the top of the hopper until its weight is sufficient to overcome the pressure of the air upon the valves 6, whereupon said valves will be spread apart thus allowing the cotton to drop downward through and between them by gravity. This cotton passes between a pair of spiked or spurred feed rolls 9, which deliver the cotton into a primary cleaning chamber 10 in which is rotatably mounted a spurred or spiked drum 11. This drum revolves downwardly and rearwardly, as shown by the arrow in Fig. 1, and carries the cotton over a rough or coarse screen surface 12, whereby the dirt and small trash are extracted from the cotton and discharged into a receptacle 13 for discharge by means of a spiral conveyer 14.

The chamber 10 is provided with a cotton discharge outlet 15, and the cotton thrown by centrifugal force from the drum 11 against the breast surface 16 of the said chamber 10 passes downward through the outlet 15 and over a guide ledge or shelf 17 into a collection chamber 18. This chamber 18 forms the hopper of a ginning device including a ginning chamber 19 in which are arranged the ginning saws 20, and which communicates at its rear with the forward portion of a fan casing 21, in which is located a rotary suction and discharge brush fan 22. The ginning chamber and fan chamber communicate at their base portions with a receiving space or chamber 23 into which the ginned cotton passes, which chamber has leading therefrom a discharge pipe 24 communicating with a cotton discharge flue 25. A wind-trunk or nozzle 26 opens under the upper rear portion of the ginning chamber and extends thereinto in the form of a long narrow or contracted nozzle extending the length of the saws, and through which air rushes to fill the partial vacuum caused by the action of the fan 22. This fan is provided with brushes which act upon the saw teeth to dislodge the cotton therefrom, and any adhering particles of cotton which are not removed by the brushes, but are loosened by the action thereof, or which remain fixed to the teeth, are freed from the saws by the blast of air from the nozzle of the wind-trunk. The long fiber from the gin is thus discharged at the rear through the conductor 24 and flue 25 to a preferred type of baling apparatus 25', such as that disclosed in my aforesaid patent, while the seed discharge from the ginning chamber through a passage 27 at the front thereof.

The seed falling through the passage 27 pass by gravity over an inclined screen shelf 28 and thence into a secondary ginning hopper or chamber 29, any dirt and sand that may be left in the seed dropping through the screen 28 into the spiral conveyer 30 which carries the same away to any suitable point of discharge. Within the hopper 29 is a rotary agitator 31 which keeps the seed in tumbling motion, the seed thus being maintained in a loose and free condition and passing by gravity from said hopper to a reginning or delinting chamber 32 in which is arranged a series of reginning or delinting saws 33. The said chamber 32 communicates with a chamber 34 within which is arranged a brush fan 35, which may be similar to the fan 22, the reginning and fan chambers communicating at their bases with a receiving space or chamber 36. The lint gathered from the seed by the saws 33 is brushed and blown from the teeth of the saws into the chamber 36 by the combined brushing and blast producing action of the fan 35, the cotton being discharged by the blast of the fan outward through a conductor 37, while the cleaned or delinted seed passes by gravity from the reginning or delinting chamber into a collecting chamber 38 in which is arranged a spiral delivery conveyer 39. This chamber is provided with a perforated or screen bottom 40, through which the dirt and other foreign substances passing thereinto with the seed discharge, the said dirt and substances being received into a small chamber 41 and transported to any suitable point of discharge by a spiral conveyer 42.

In action the delinter saws 33 rotate at a much higher rate of speed than the saws 20, and hence act efficiently upon the seed to separate the lint therefrom, the lint or short fiber separated from the cotton being directed through the conductor 37 by the blast of air from the fan 35 against a rotary screen drum 43, against which bear one or more yielding or spring actuated pressure rollers 44, whereby in the revolution of the drum the cotton taken up by the screen is lapped or formed into a bat and wound upon a removable core or spool 45 which may be removed when filled and replaced by another so that the operation of forming the lint or short fiber into small rolls or bats may be continuously carried out. The delinted and cleaned seed acted upon by the conveyer 39 discharges by gravity from the chamber 39 through conductors 46, arranged at convenient points, whereby the seed are conveyed to a seed mill for the extraction of the oil, as hereinafter described.

Any convenient or preferred type of oil extracting apparatus may be used in this system, but the machine shown in the present instance is constructed as follows:—The frame or casing 47, which may be of suitable type, is provided with a conical extracting chamber 48, provided with longitudinally extending case-hardened steel ribs 48', and having at its discharge end narrow discharge slits or slots 49. In this chamber operates a feeding and crushing cone 50 having at its reduced end spiral feed blades 51, by which the seed entering the reduced end of the chamber 48, through an inlet 51 communicating with one of the chutes 46, are fed forward toward the enlarged end of said chamber. The seeds as they pass forward are crushed between the wall of the chamber and enlarged portion of the cone 50, the oil expressed from the seeds being discharged through the slits 49 and passing through the drainways 52 to a conductor 53 leading to a suitable storage reservoir through which the oil flows by gravity, while the solid or refuse material discharges at the enlarged end of the chamber into a chute 54 by which the said solid substance or oil cake is conducted to a spiral conveyer 55. This conveyer 55 conducts the oil cake to an endless elevator 56 leading upwardly to a suitable point and arranged to discharge the oil cake through a spout 57 into a receptacle 58. This receptacle is provided with a drop bottom 59 controlled by suitable weighing mechanism, whereby when a predetermined amount of the oil cake is discharged thereinto the drop bottom will open and deliver the material into a suitably supported sack or receptacle 60. When this sack or receptacle is filled it is removed and closed by sewing or in any other suitable manner, and a new sack substituted in its place, provision thus being made for packing the solid material in specified quantities for sale as animal feed or for other purposes.

The cone 50 is hollow and is arranged to revolve upon a stationary tubular shaft or pipe 61, through which steam, electricity or other artificial heat is supplied to heat the oil expressing apparatus to secure the exudation and more ready expression of the oil and discharge of the same from the press. This pipe may be perforated for the discharge of steam therefrom into the hollow cone, and suitable controlling valves and means for carrying off the water of condensation, when necessary, may be employed. The steam pipes extend through stuffing boxes 62, whereby leakage of steam from the expression chamber is prevented, the heating of the apparatus enabling it to be started at all times without loss of efficiency, since the artificial heating of the seed prevents that loss of time and efficiency encountered in crushing the seed under the cold process, in which friction is relied upon as an agent for heating the seed to the proper degree for liberation of the oil.

In practice, it is designed to employ a battery or series of sets of ginning, linting, cleaning, baling, oil expressing and sacking devices, which set of devices constitute a working unit, any number of which units may be employed, and which units may be driven from a suitable source of power and operated singly or in any desired number in series as desired or as circumstances may be found advisable. For this purpose, the steam supply pipe may be continuous, or the individual pipes of the oil expressing devices may be suitably coupled up between adjacent expressing devices.

In the use of a series of units of this character, shafts 20' and 33' of the ginning and reginning saws will be hollow and arranged to revolve upon continuous power shafts 63 and 64, respectively, suitable clutch devices 65 being provided for throwing each of said shafts 63 and 64 into and out of connection with its power shaft.

The means for driving the parts of the apparatus comprise a main drive shaft 66, receiving power from any suitable source and on which are pulleys 67, 68, 69 and 70 which transmit motion to a series of drive belts or chains 71, 72, 73 and 74. The belt 71 passes around a pulley 75 on the power shaft 63 for driving the shafts 20' of the sets of regulating saws 20, which saws in turn communicate motion to the associated brush fans 22 through shaft 20' and gearing or belting 76 and to the drums 11 through belts or chains 77, the feeders 9 being driven from said drums through gearing 78 while the conveyer 14 is driven by a belt or chain 79 directly from the shaft 63. The belt 72 passes around a pulley 80 on the shaft 64 and drives the shafts 33' of the reginning saws, which in turn transmit motion to the brush fans 35 by means of gearing or belting 81, while belts 82 and 83 respectively communicate motion to the conveyer 31 from shaft 64 and to the agitator or feeder 31 from shaft 33', the conveyer 39 being driven by the belt 73 and in turn communicating motion to the conveyer 42 through a belt or chain 85. The belt 74 communicates motion through a shaft 86 and associated gear train 86' to the shaft of the associated oil press, while a belt 74' drives the elevator 56 from which motion is communicated to the conveyer 55 by means of a belt 87. Thus it will be seen that all of the parts of the apparatus may be driven from a single line shaft, and that any one or more of the units may be thrown into and out of action to run the plant at any given capacity and to enable one or more units to be shut down for cleaning, repairs and other purposes without interfering with the operation of the others.

Furthermore, it will be seen that the apparatus will take the cotton as it comes from the bolls and separate the dirt therefrom, gin the seed, form the bulk of the cotton and gather the lint into bales, then regin the seed and take off the linters or short staples, thus preventing waste of cotton and separating the spinable cotton from the linters, and separate the oil from the seed and convey the oil and oil cake or solid residue to suitable points for storage or transportation, thus enabling the entire process to be handled in a single, continuous operation from the delivery of the cotton to the mill to the manufacture of the bale and expression of the oil and the package of the oil cake in suitable form for sale or storage for home consumption, whereby great economy is effected over the usual systems in use.

I claim:—

1. In an apparatus of the character described, the combination of a gin, a baling means for the long fiber from the gin, a delinter, lapping means for the short fiber from the delinter, and means for operating the working parts.

2. In an apparatus of the character described, the combination of a gin, a baling means for the long fiber from the gin, a reginner or delinter, means for cleaning and agitating the seed on its passage from the gin to said reginner or delinter, a lapping means for the short fiber from the reginner or delinter, and means for operating the working parts.

3. In an apparatus of the character described, pneumatic feed mechanism, a feeding and screening device for acting upon the material delivered thereby, a ginning mechanism to act upon the material received from said feeding and screening device, a reginning mechanism, feeding and screening means between the same and the ginning mechanism, means for baling the long fiber from the gin, means for forming a bat from the lint from the ginning mechanism, and means for operating the working parts.

4. In an apparatus of the character described, the combination with a ginning mechanism, and means for delivering the cotton thereto, of a baling mechanism, pneumatic means for delivering the ginned cotton from the ginning mechanism to the baling mechanism, a reginning apparatus, arranged below said ginning mechanism, for the gravitative feed of the seed thereto, said reginning apparatus being operative for delinting the seed, a bat former for forming a bat from the lint, and pneumatic means for delivering the lint thereto from said reginning apparatus.

5. In an apparatus of the character described, the combination, with a ginning mechanism, and means for delivering the cotton thereto, of a baling apparatus for baling the bulk of ginned cotton, pneumatic means for delivering the cotton thereto from the ginning mechanism, a reginning apparatus arranged below the ginning mechanism for the gravitative feed of the seed thereto, said reginning apparatus being operative for delinting the seed, a refuse screen arranged in the line of feed of the seed from the ginning mechanism to the reginning apparatus, and including means for carrying off the refuse material, a bat former, and means for pneumatically delivering the lint from the reginning apparatus to the said bat former.

6. In an apparatus of the character described, the combination, with a ginning mechanism, of means for delivering the cotton thereto, a baling apparatus for baling the bulk of ginned cotton, means for delivering the ginned cotton thereto, a reginning mechanism for delinting the seed, said reginning mechanism including a hopper arranged below the ginning mechanism for the gravitative feed of the seed thereto, an agitator arranged within said hopper, a refuse screen disposed in the line of feed of the seed from the reginning apparatus to said hopper, and including means for carrying off the refuse, a bat former, and means for delivering the lint thereto from the reginning apparatus.

7. In an apparatus of the character described, the combination, with a ginning mechanism, and means for delivering the cotton thereto, of a baling apparatus for baling the bulk of ginned cotton, pneumatic means for delivering the cotton thereto from the ginning mechanism, a reginning apparatus for delinting the seed, said apparatus including a hopper arranged below the ginning mechanism for the gravitative feed of the seed thereto, an agitator within said hopper, a refuse screen and seed guide arranged in the path of flow of the seed from the ginning mechanism to the hopper and including means for carrying off the refuse material, a bat former, means for delivering the lint thereto from the reginning apparatus, and means for discharging the seed from the reginning apparatus for further treatment.

In testimony whereof I affix my signature in presence of two witnesses.

SAMUEL H. DUNLAP.

Witnesses:
WILLIE KRENEK,
A. W. RHODES.